Aug. 8, 1933.    R. W. ROBERTSON    1,921,945
OYSTER CULTURE
Filed Sept. 14, 1932
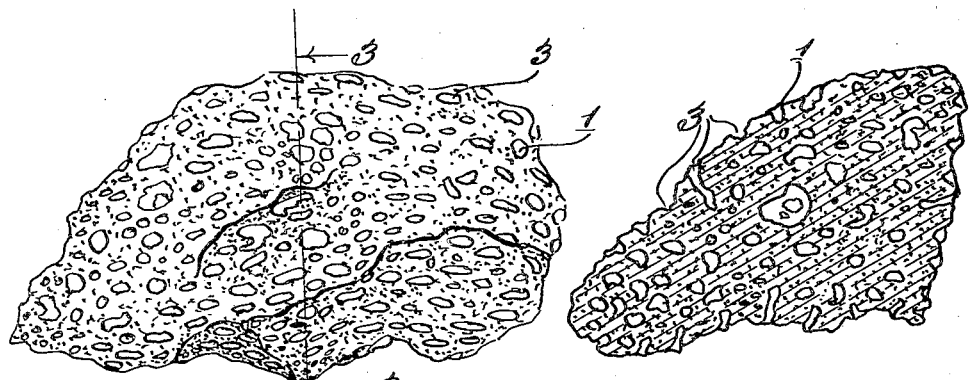
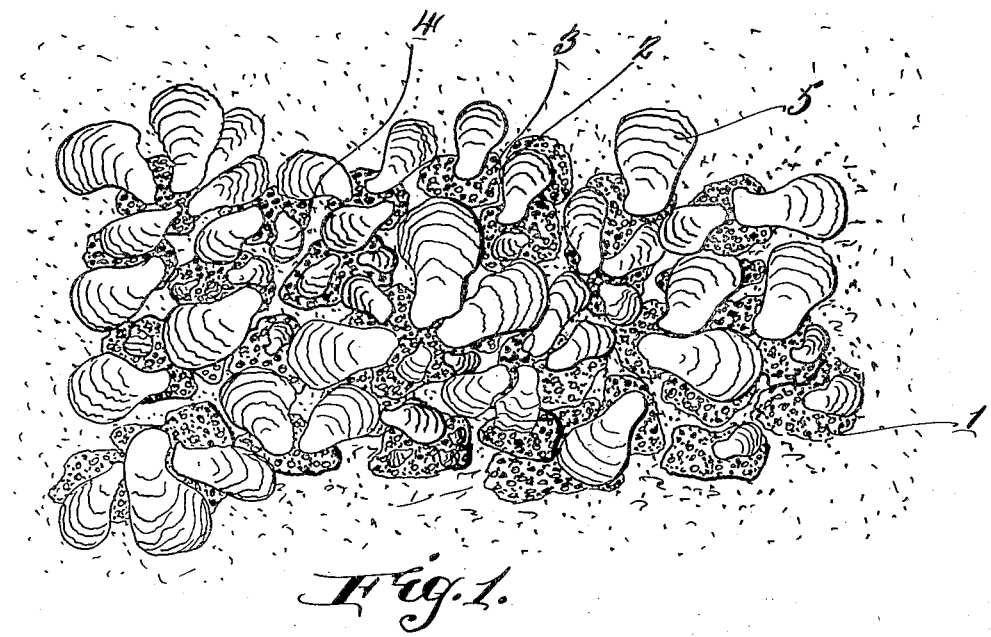

Patented Aug. 8, 1933

1,921,945

UNITED STATES PATENT OFFICE 1,921,945

OYSTER CULTURE

Rollin W. Robertson, Baltimore, Md.

Application September 14, 1932
Serial No. 633,120

1 Claim. (Cl. 119—4)

The present invention or discovery relates particularly to improvements in oyster culture, and is specifically identified with improvements in making artificial beds for the spawning, growth and development of oysters and the like, together with providing improved means for the collection of oyster spat.

It is well understood at the present time that the various coastal States are having great difficulty in maintaining their oyster supplies, due to the constantly increasing demand for this type of shell food, together with the increasing demand not only for the oysters themselves as a sea food for man, but also the constant demand for the oyster shells themselves. The value of and demand for these shells is ever increasing, due to their being used for making lime used as a fertilizer, poultry grit, shell roads, ballast for railroad track beds, etc.

The object of the present invention is to provide a thoroughly practical and economical substitute for oyster shells that will be the full equivalent of oyster shells for use as oyster cultch in forming and planting oyster beds, in oyster culture. This substitute is in the form of blast furnace slag. The supply of this slag is available in abundant quantities and can be easily and economically converted into proper sizes for oyster cultch.

In the accompanying drawing I have illustrated various features of my invention in their preferred form, in order that these and other features of my invention or discovery may be more clearly understood.

In the drawing:

Figure 1 is a fragmentary view, somewhat in perspective illustrating the application of my invention as applied to an artificial oyster bed.

Figure 2 is a side elevation of a piece of blast furnace slag as used in my invention.

Figure 3 is a sectional view of the same, taken on the line 3, 3 of Figure 2.

Referring to the drawing by reference numerals, each of which represents the same or similar parts throughout the various views, the invention or discovery consists broadly in the use of blast furnace slag 1 as shown in detail, particularly in Figures 2 and 3 of the drawing, as a means for providing an artificial bed or cultch, as indicated at 2, for the spawning, growth, development and production of oysters.

One of the well known characteristic structural features of blast furnace slag is its unusual porosity formed throughout its structure by innumerable pores 3 of various shapes, depths, etc. The pores 3 present unusually favorable means for the collection of oyster spat thereon, the pores presenting a natural roughened surface and positioning structure for the young oyster spat until the same has had sufficient time to make its position permanent by cementing itself to the slag structure. From then on the life of the attached oyster is fairly secured as to growth and development.

It might be well to explain at this time, for purposes of bringing out this important feature of the favorable porosity of blast furnace slag, in relation to oyster culture, that the embryo oyster, which forms after the egg is discharged into the water by the mother oyster, is microscopically small, soon becomes covered with minute fleshly bristles, which beating in unison give it power of locomotion. After a brief career of travel, by being carried here and there due to the influence of the tidal currents, a tiny shell begins to form about the oyster, and as the burden and weight of this shell structure increases, it becomes necessary for the small oyster to attach itself to a support and settle down to the sedentary life of the adult. In the culture and development of oysters, this is one of the gravest periods in its life. It is necessary if the young oyster is to live, for it to find a surface that is not muddy, on which to attach itself, such as the usual oyster bed structure of oyster shells. These surfaces must be sufficiently clean and free from mud as possible to preserve the life of the young oyster, otherwise a surface having even a small amount of mud will mean death, due to the stifling and smothering effect it has on the oyster.

This blast furnace slag may be broken or crushed to appropriate size, which would be suitable for forming the proper size "voids" in the oyster beds and which could be most efficiently handled by the oyster dredges and tongs. These "voids", i. e., the spaces formed between the various pieces of slag cultch in the oyster beds, may be readily determined as to size, by controlling the size of the slag planted, as it has been found that blast furnace slag does not pack and settle down in the oyster beds, due to the fact there is very little, if any disintegration, as and in relation to the purpose of the inventor. These "voids" are substantially safe and form a protective and permanent place in which the young oyster may develop. Blast furnace slag is found to be light in structure, due to its composition and unusual porosity, making it very adaptable for use as a substitute for oyster shells. This lightness of the slag allows for greater spreading and coverage as to a given weight over the other well known oyster shell substitutes and cultches, such as gravel, crushed stone, granite, etc. The inventor's blast furnace slag, which is in small units having length, width and height of not less than 1″ and not more than 3″ in dimension, is very light in comparison to the above mentioned cultches, making it easier to raise from the oyster beds by the tongers and dredgers.

Blast furnace slag, as proposed to be used by the inventor is defined as a non-metallic product consisting essentially of silicate and alumino-silicate of lime, which is developed simultaneously with iron in a blast furnace, and quite similar in chemical analysis to oyster shell, as follows:

|  | Percent |
|---|---|
| Calcium oxide (lime) | CaO—40 |
| Silica | SiO2—35 |
| Alumina | Al—10 |
| Magnesium oxide | MgO—7 | and weighs from fifty to seventy pounds per cubic foot, which is about the same weight as oyster shells under certain conditions. Although the above analysis for blast furnace slag is substantially correct the combinations of the elements may vary slightly and unless the calcium oxide contents is more than 30% and the silica contents is more than 20% of the total volume of the units they are not deemed proper material for oyster cultch.

Figure 1 of the drawing illustrates a portion of the artificial oyster bed 4 composed of blast furnace slag 1, disclosing oysters indicated by reference numeral 5 at various stages in their growth adhering to the slag. For purposes of replenishing the thousands of barren oyster beds existing today, there is available enormous quantities of blast furnace slag to be found around all steel furnaces. The amounts available for this useful purpose being used as an oyster spat collector or oyster cultch in replanting and maintaining oyster beds, in fact, has become a problem of the steel plants as to the disposition of the same.

This blast furnace slag may also be easily handled from the point of origin to the various oyster farms or rocks where it is to be planted, as it can be loaded from cars to boats or purchased in the same way that coal is handled, and then unloaded with steam shovels or by hand in the usual way that oyster shells are handled for purposes of oyster bed planting. With such enormous supplies of blast furnace slag available, it will now be possible to increase the available oyster food supply to an unlimited degree, as not only may the present established oyster beds be maintained as to their natural growth and development and barren oyster beds replenished with oyster cultch, making them productive oyster beds, but new oyster beds may be planted in any desirable or favorable location.

The value of this invention or discovery may be fully appreciated when it is realized that with the use of the inventor's discovery it will be possible to produce on four barren acres of oyster ground upward of four thousand bushels of oysters in three years' time, or approximately 4,000 gallons or thirty-six thousand pounds of pure food, that is well known for its invaluable disease preventing salts and iodine content. It should be understood that this approximate output, after the barren field has had time to grow and develop over the period of the approximate time of three years, would then become a yearly output. This replenishing of present day active oyster beds with new oyster cultch, together with the reestablishing and development of the heretofore depleted and barred oyster beds, as well as the establishment and growth of entirely new oyster beds or farms, would be practical only with a material such as blast furnace slag having all the various qualities as heretofore set out in this specification as discovered by the inventor, together with the unlimited available supply of this material which will be as cheap if not cheaper than the oyster shells themselves. Thus, large and unlimited areas may be satisfactorily maintained with the proper amount of oyster cultch.

It is well known in oyster culture that oyster spat occur in large numbers in the vicinity of spawning oysters and that after a short period of swimming they settle to the bottom and attach themselves to some available and favorable object which will support them above the muddy bed of the water, but as their locomotion is very much restricted they cannot go in search for such a resting place. Therefore, many are lost because in settling they do not come in contact with a favorable cultch. The purpose of this invention is to supply broken blast furnace slag to oyster beds for collecting of this spat.

What I claim as new and desire to secure by Letters Patent is:

An oyster cultch and spat collector consisting of one or more small units, each unit having length, width and height dimensions of not less than 1″ and not more than 3″, the said units consisting essentially of calcium oxide, silica, alumina and magnesium oxide, and the said units being porous and containing not less than 30% calcium oxide and not less than 15% silica for the purpose of developing oyster spat thereon.

ROLLIN W. ROBERTSON.